US006648316B1

(12) United States Patent
Vouland

(10) Patent No.: US 6,648,316 B1
(45) Date of Patent: Nov. 18, 2003

(54) DEVICE FOR CENTERING AND CLAMPING A SHEET METAL ASSEMBLY OR A MECHANICAL PART

(76) Inventor: Patrice Vouland, 1, Square Pajou, Fontenay aux Roses (FR), F-92260

( * ) Notice: Subject to any disclaimer, the term of this patent is extended or adjusted under 35 U.S.C. 154(b) by 0 days.

(21) Appl. No.: 09/744,193

(22) PCT Filed: Jul. 19, 1999

(86) PCT No.: PCT/FR99/01765

§ 371 (c)(1), (2), (4) Date: Jan. 22, 2001

(87) PCT Pub. No.: WO00/05035

PCT Pub. Date: Feb. 3, 2000

(30) Foreign Application Priority Data

Jul. 20, 1998 (FR) .......................................... 98 09222

(51) Int. Cl.$^{7}$ .......................................... B23Q 3/08

(52) U.S. Cl. ............................ 269/24; 269/32; 269/49; 269/34

(58) Field of Search ............................ 269/49, 32, 47, 269/228, 34, 50, 51, 52, 24, 233

(56) References Cited

U.S. PATENT DOCUMENTS

| | | | | |
|---|---|---|---|---|
| 2,377,086 A | | 5/1945 | Lang | |
| 4,331,326 A | * | 5/1982 | Strouss | 269/32 |
| 4,509,298 A | * | 4/1985 | Klievoneit | 269/32 |
| 4,618,131 A | * | 10/1986 | Campisi et al. | 269/32 |
| 5,490,663 A | * | 2/1996 | Stojkovic et al. | 269/32 |
| 5,595,375 A | * | 1/1997 | Bennhausen | 269/32 |
| 5,688,014 A | * | 11/1997 | Kot | 269/32 |
| 6,102,383 A | * | 8/2000 | Tunkers | 269/32 |

FOREIGN PATENT DOCUMENTS

| | | |
|---|---|---|
| DE | 29718643 U1 | 1/1998 |
| FR | 2733930 A1 | 11/1996 |
| FR | 2755049 A1 | 4/1998 |
| FR | 2757437 A1 | 6/1998 |

* cited by examiner

*Primary Examiner*—Robert C. Watson
(74) *Attorney, Agent, or Firm*—Young & Thompson

(57) ABSTRACT

The device includes a hollow pilot equipped with at least two retractable hooks and driven by a piston provided with a groove, the whole assembly being mounted on a supporting nosepiece. The piston is locked in clamping position by a three-point system actuated by a pneumatic cylinder. The device assembly is integrated in a housing. The device is designed to equip fixed or mobile posts for assembling vehicles, or clamping arms.

8 Claims, 3 Drawing Sheets

DEVICE FOR CENTERING AND CLAMPING A SHEET METAL ASSEMBLY OR A MECHANICAL PART

FIELD OF THE INVENTION

The present invention relates to a centring and clamping device which permits a two-dimensional geometric positioning X-Y of a sheet-metal assembly such as a bodywork element or of a mechanical part in a piloting hole provided for this purpose, and its clamping in the Z axis.

BACKGROUND OF THE INVENTION

The techniques normally used separate the centring and clamping functions.

Document FR2757437 discloses in particular a centring and gripping tool of the type comprising a pilot organ borne on the end of a casing and gripping organs. This tool includes means of pivoting and translational drive of the gripping organs between a centring position in which the gripping organs are retracted inside the pilot organ and several gripping positions in which the gripping organs project outside the pilot organ and rest on the part, these drive means being arranged to simultaneously produce the pivotal and translational drive of the gripping organs.

Document FR2755049 discloses a pilot grip for centring, gripping or holding a part, comprising a pilot borne by a casing and linearly mobile between a position where it is withdrawn in the casing and a position where it projects out of the casing. Means of driving the pilot in linear displacement also drives gripping organs in linear displacement, these gripping organs being drivable in linear displacement between two extreme gripping and releasing positions by second drive means which are independent of the means driving the pilot.

Document FR2733930 discloses a device for indexing a part through a hole in this part, comprising a sleeve having an upper face forming a support for the part, a piston mounted in the sleeve to slide under the action of drive means between a withdrawn position inside the sleeve and a deployed position in which it extends projecting from the upper supporting face of the sleeve with an end-portion forming an indexation pin, and a system for locking the part on the upper supporting face of the sleeve comprising at least one jaw mounted mobile on the centring pin in order to move under the action of control means between an active position in which it forms a stop for the part and an inactive position in which it allows free passage to the indexation pin through the hole of the part.

SUMMARY OF THE INVENTION

The aim of the present invention is to propose a new centring and clamping device which more closely links the gripping and clamping functions, compared with the state of the art illustrated by the aforementioned documents, in particular with piloting holes of small diameter, for example less than 25 mm, and opening out into a hollow body.

This aim is achieved with a centring and clamping device permitting a geometric management X, Y, Z of a sheet-metal assembly or a mechanical assembly.

According to the invention, this device comprises a hollow pilot procuring a centring management X, Y, fitted with at least two retractable hooks procuring a clamping management Z and each provided with a lug, and powered by a piston which slides inside the hollow pilot. This piston is provided with a characteristic groove which permits the drive in rotation of the hooks by means of their respective lugs.

The grooved piston is advantageously driven in translation by a three-point system permitting locking in clamping position, and actuated by a pneumatic jack or a manual three-point system.

The assembly (pilot, piston, hooks) is mounted on a supporting nosepiece which determines the supporting face of the part to be clamped. A washer inserted between the fixing face of the pilot and the base of the supporting nosepiece permits the adjustment of the thickness of the part that is to be clamped by modification of its thickness.

The level of the hooks (position of the lugs relative to the axes of rotation) is set through an adjusting screw. Dynamic washers inserted between the thrust head of the three-point system and the adjusting screw permit the absorption of any variations in thickness of the part to be clamped, without damage to the axes of rotation.

The whole of the system is integrated in a housing which can be fixed by three of its faces or by the supporting nosepiece in a mechanical assembly.

BRIEF DESCRIPTION OF THE DRAWINGS

Other special features and advantages of the invention will appear in the following description. In the attached drawings, which are provided by way of non-limitative examples.

DETAILED DESCRIPTION OF THE INVENTION

There follows a description of a first embodiment of a centring and clamping device according to the invention, with reference to FIGS. 1, 2, and 4 to 7.

Figure 4:
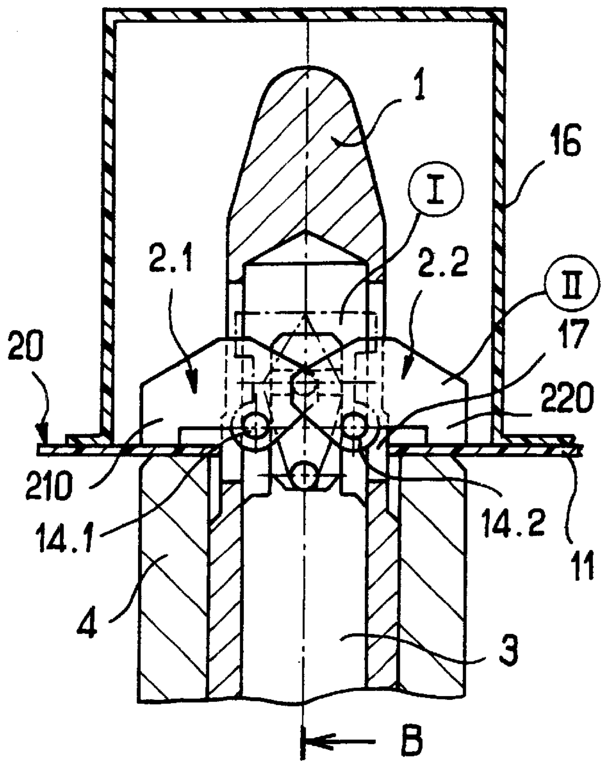
FIG. 4 represents a detail A of the centring and clamping device represented in FIG. 1.
Figure 7:
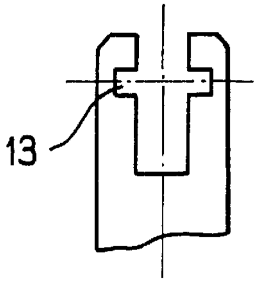
FIG. 7 represents a detail of the groove 13 of the piston 3 represented in FIG. 5.
Figure 6:
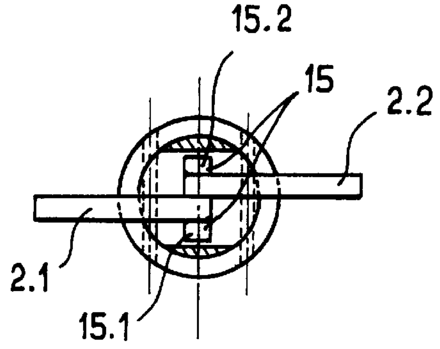
FIG. 6 represents a view from above of the detail A represented in FIG. 4.

The centring and clamping device D1 includes a hollow pilot 1 (geometric management X-Y), fitted with two hooks 2.1, 2.2 articulated on their axes 14.1, 14.2 (FIG. 4). The rotation of the hooks 2.1, 2.2 is effected by thrust (clamping) and traction (unclamping) on the piston 3 which comprises a groove 13 (FIGS. 5 and 7) driving the hooks 2.1, 2.2 in rotation through their lugs 15.1, 15.2 (FIG. 6).

The assembly (pilot 1, hooks 2.1, 2.2 and piston 3) is fixed on the supporting nosepiece 4 which determines the supporting plane 11 of the element to be clamped. The supporting nosepiece 4 is fixed on a reference face 12 of the housing 9.

The thickness EP to be clamped is adjusted by modification of the thickness of a washer 5. An adjusting screw 6 permits the level of the lugs 15.1, 15.2 to be set relative to the axes of rotation 14.1, 14.2 of the hooks 2.1, 2.2. Dynamic washers 7 inserted between the thrust head of the three-point system 8 and the adjusting screw 6 permit the absorption of the differences in thickness to be clamped.

A pneumatic jack 10 serves for the movement of the three-point system 8 and of the piston 3. The assembly of the centring and clamping device is integrated in a housing 9.

Figure 1:
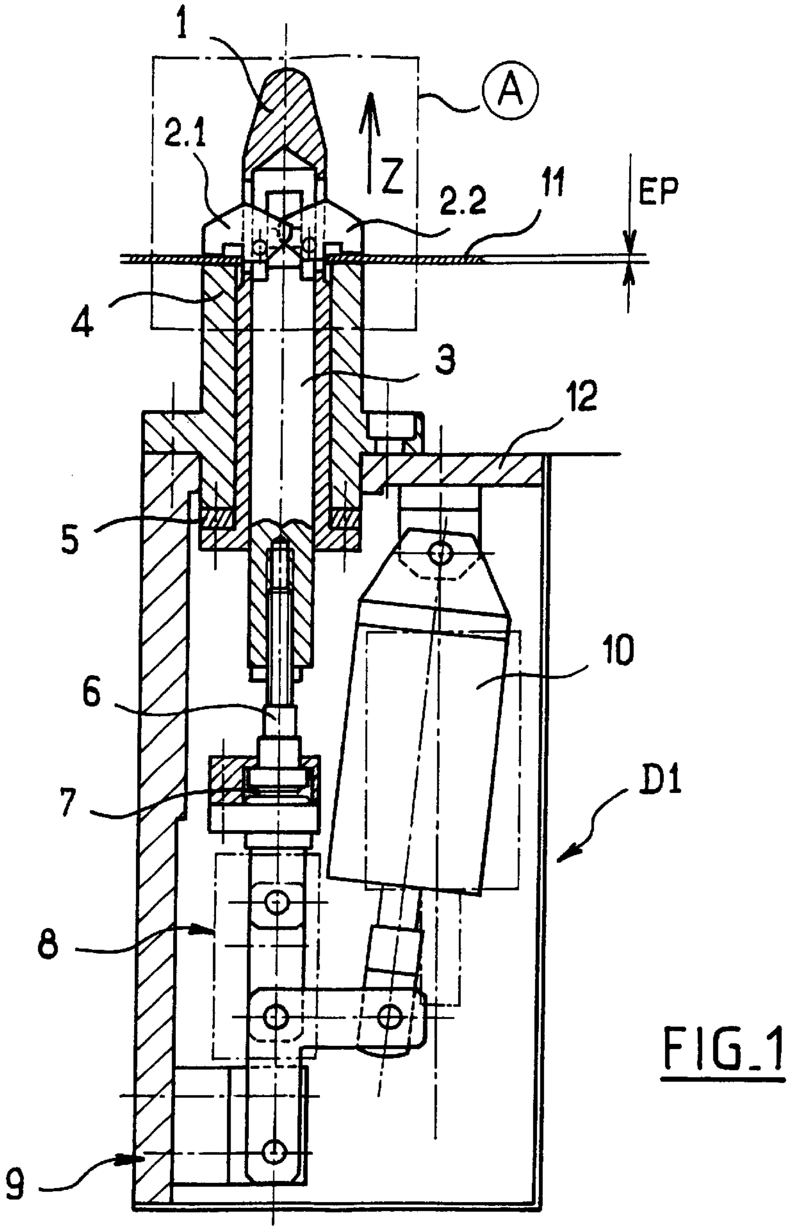
FIG. 1 represents in section a first embodiment of a centring and clamping device according to the invention, fitted with a jack.
Figure 2:
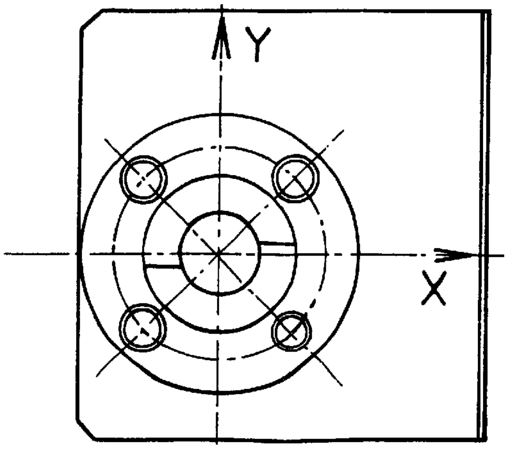
FIG. 2 is a view from above of the centring and clamping device of FIG. 1.
Figure 3:
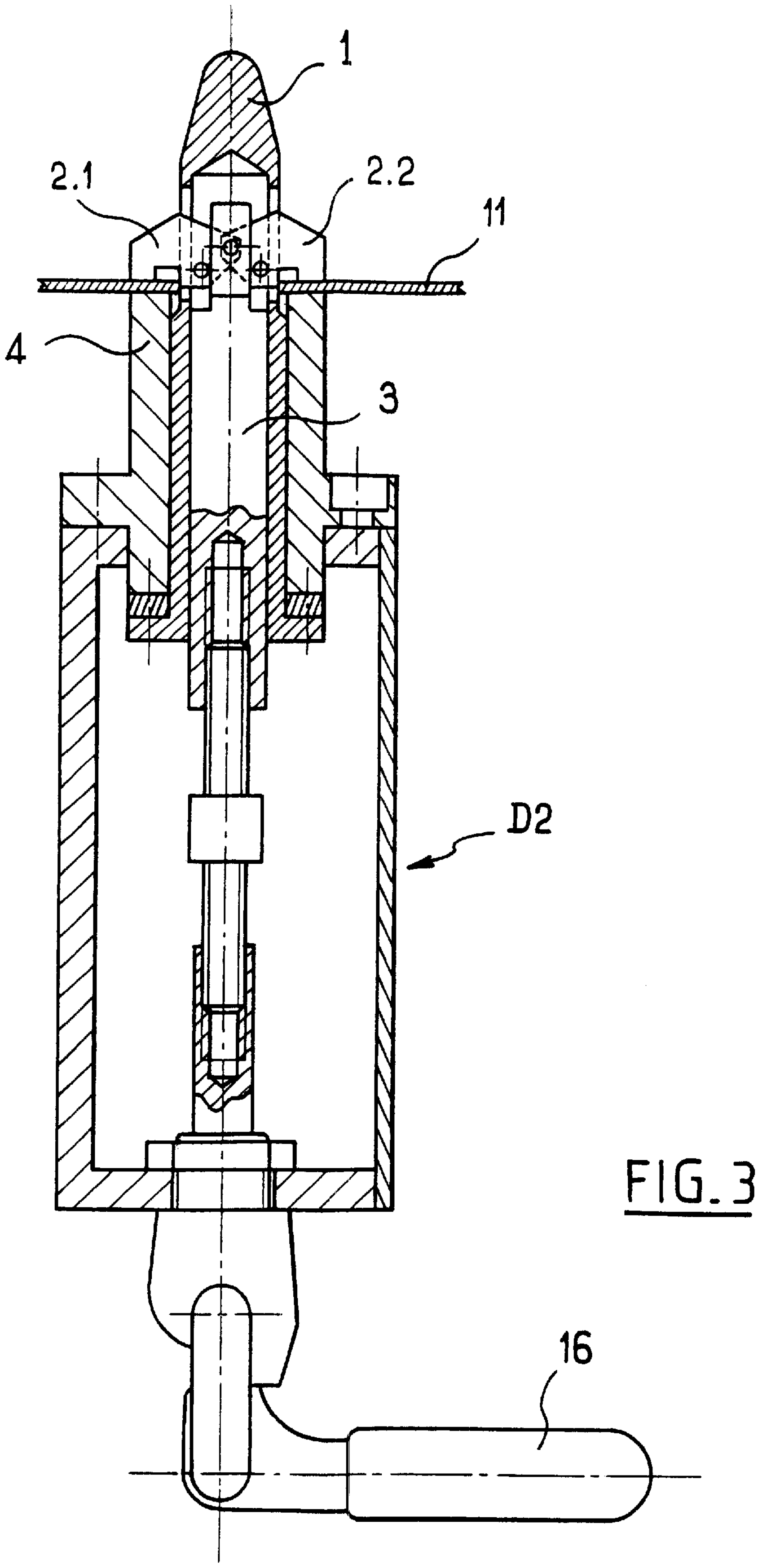
FIG. 3 represents a second embodiment of a centring and clamping device according to the invention, in a manual variant.
Figure 5:
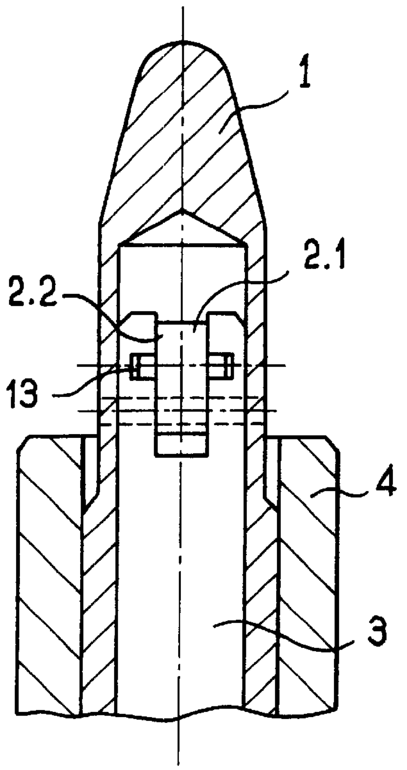
FIG. 5 represents a section B of the detail A represented in FIG. 4.

In a second embodiment of a centring and clamping device D2 represented in FIG. 3, the movement of the piston 3 is effected by a manual three-point system 16.

There follows a description of an example of use of a centring and clamping device according to the invention, with reference to the aforementioned figures.

There is considered for example a bodywork part 20 that is to be clamped, provided with a hole 17 covered for example by a piece of sheet metal 16 defining a housing provided to receive a pilot.

The hollow pilot 1 is inserted into this hole until the supporting nosepiece comes to a stop against the lower supporting plane 11 of the bodywork part 20. The two hooks 2.1, 2.2 are at this stage in retracted position I (FIG. 4) and thus do not impede the penetration of the hollow pilot 1 into the hole 17.

The piston 3 is then operated by means of the pneumatic jack 10 or manually (variant represented in FIG. 3), which has the effect of driving the hooks 2.1, 2.2 in rotation about their respective axes 14.1, 14.2 integrated in the pilot 1, through their lugs 15.1, 15.2, themselves driven by the groove 13 of the piston 3.

This rotation of the hooks 2.1, 2.2 ends when their hooking ends 210, 220 come to a stop against the upper face of the bodywork part 20 on either side of the hole 17, in clamped position II (FIG. 4).

The reverse operation of unclamping and withdrawal of the hollow pilot is effected by pulling on the piston 3, which has the effect of retracting the hooks 2 by reverse rotation about the axes 14.1, 14.2.

The invention is not, of course, limited to the examples which have just been described and numerous adjustments can be made to these examples without exceeding the scope of the invention. Thus, systems for adjusting the thickness of the element to be clamped other than those which have just been described can be envisaged. Moreover, other means of actuating the piston can be provided, making use for example of electromechanical organs. In addition, the number of clamping hooks can be greater than two.

What is claimed is:

1. A centring and clamping device for a sheet-metal assembly or a mechanical part along three orthogonal axes, the device comprising a hollow pilot, for geometric centring along two orthogonal axes, fitted with at least two retractable hooks for geometric clamping along a third orthogonal axis, articulated on axes and powered by a piston which slides inside the hollow pilot, the retractable hooks provided with lugs and the piston provided with a driving groove which permits the drive in rotation of the hooks through the lugs; the device further comprising a supporting nosepiece which determines the supporting face of the part to be clamped, on which are mounted the pilot, the hooks and the piston, and also comprising a washer inserted between the fixing face of the pilot and the base of the supporting nosepiece, the washer being provided for the adjustment of the thickness of the part to be clamped, by modification of its thickness.

2. The device according to claim 1, wherein the grooved piston is driven in translation.

3. The device according to claim 2, wherein the piston is actuated manually.

4. The device according to claim 1, further comprising an adjusting screw for setting the level of the hooks by position of the lugs relative to the axes of rotation.

5. The device according to claim 4, further comprising one or more dynamic washers to absorb any variations in thickness of the part to be clamped.

6. The device according to claim 1, wherein the device is integrated in a housing within a mechanical assembly.

7. The device according to claim 6, wherein the housing is fixed within the mechanical assembly.

8. The device according to claim 6, wherein the housing is fixed within the mechanical assembly by the supporting nosepiece.

* * * * *